United States Patent [19]

Brand

[11] 4,382,566
[45] May 10, 1983

[54] LIGHTWEIGHT AIRCRAFT

[76] Inventor: Rolf Brand, 212 N. Mecklenburg Ave., South Hill, Va. 23970

[21] Appl. No.: 213,458

[22] Filed: Dec. 5, 1980

[51] Int. Cl.³ .......................... B64D 27/00; B64C 1/16
[52] U.S. Cl. ...................................... 244/13; 244/54; 244/DIG. 1; 244/119
[58] Field of Search ................. 244/13, 67, 54, 117 R, 244/55, 119, 65, 60, 87, 308, 26; 248/556, 557; 416/500, 244 R, 170, 204

[56] References Cited

U.S. PATENT DOCUMENTS

| | | | |
|---|---|---|---|
| 899,350 | 9/1908 | Steinhaus | 244/13 |
| 1,038,633 | 9/1912 | O'Bryan | 244/13 |
| 1,131,380 | 3/1915 | Huebner et al. | 244/13 |
| 1,158,594 | 11/1915 | Vintila | 244/87 |
| 2,070,782 | 2/1937 | Canney | 248/556 |
| 2,166,259 | 7/1939 | Meyer | 308/26 |
| 3,013,749 | 12/1961 | Dunham | 244/65 |

FOREIGN PATENT DOCUMENTS 716192  12/1931  France ................. 244/67

*Primary Examiner*—Galen L. Barefoot
*Attorney, Agent, or Firm*—Lalos, Leeds, Keegan, Lett & Marsh

[57] ABSTRACT

In a lightweight aircraft having a principal longitudinal load-carrying member, a wing structure mounted on the load-carrying member, a tail rudder and elevator assembly mounted on the load-carrying member, a propeller mounted on the load-carrying member for rotation about the member's longitudinal center line, an engine mounted on the load-carrying member, and means drivingly connecting the engine to the propeller.

13 Claims, 8 Drawing Figures

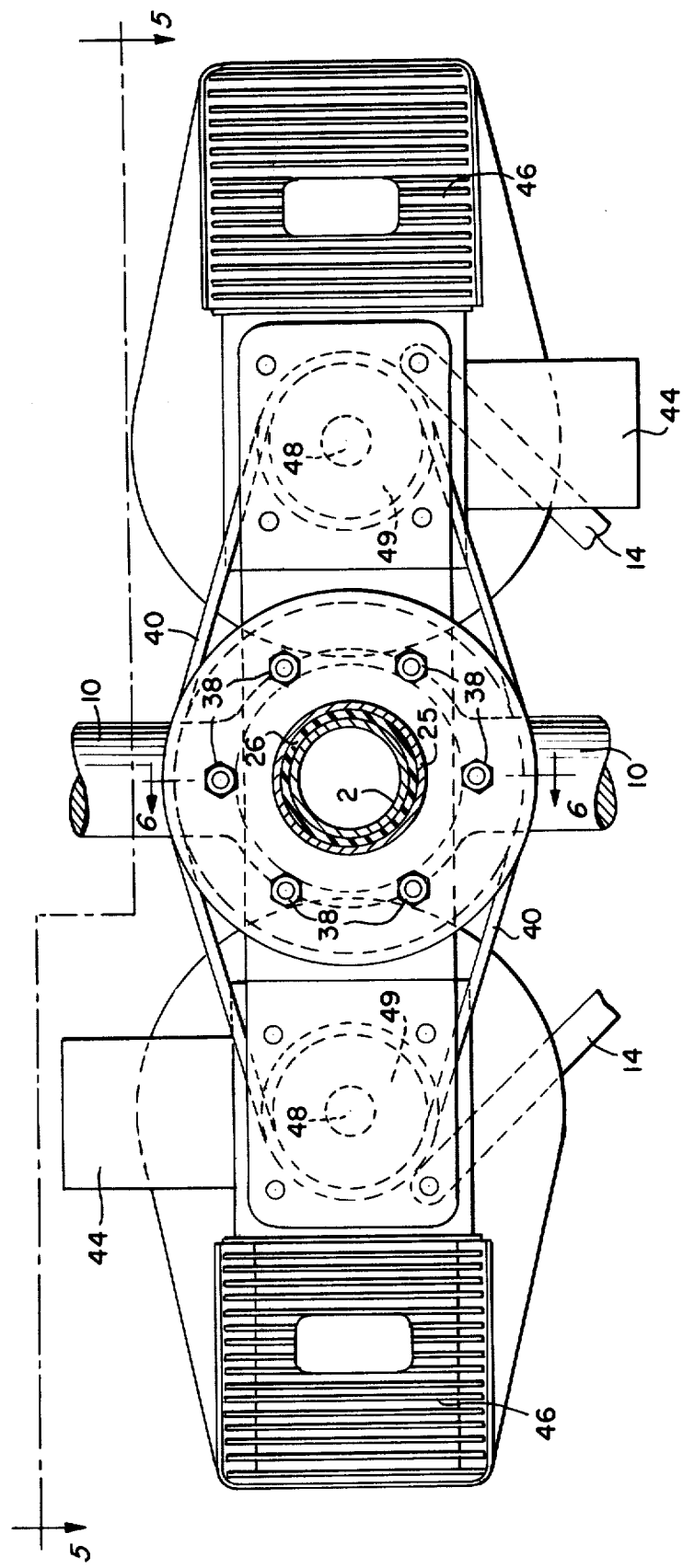

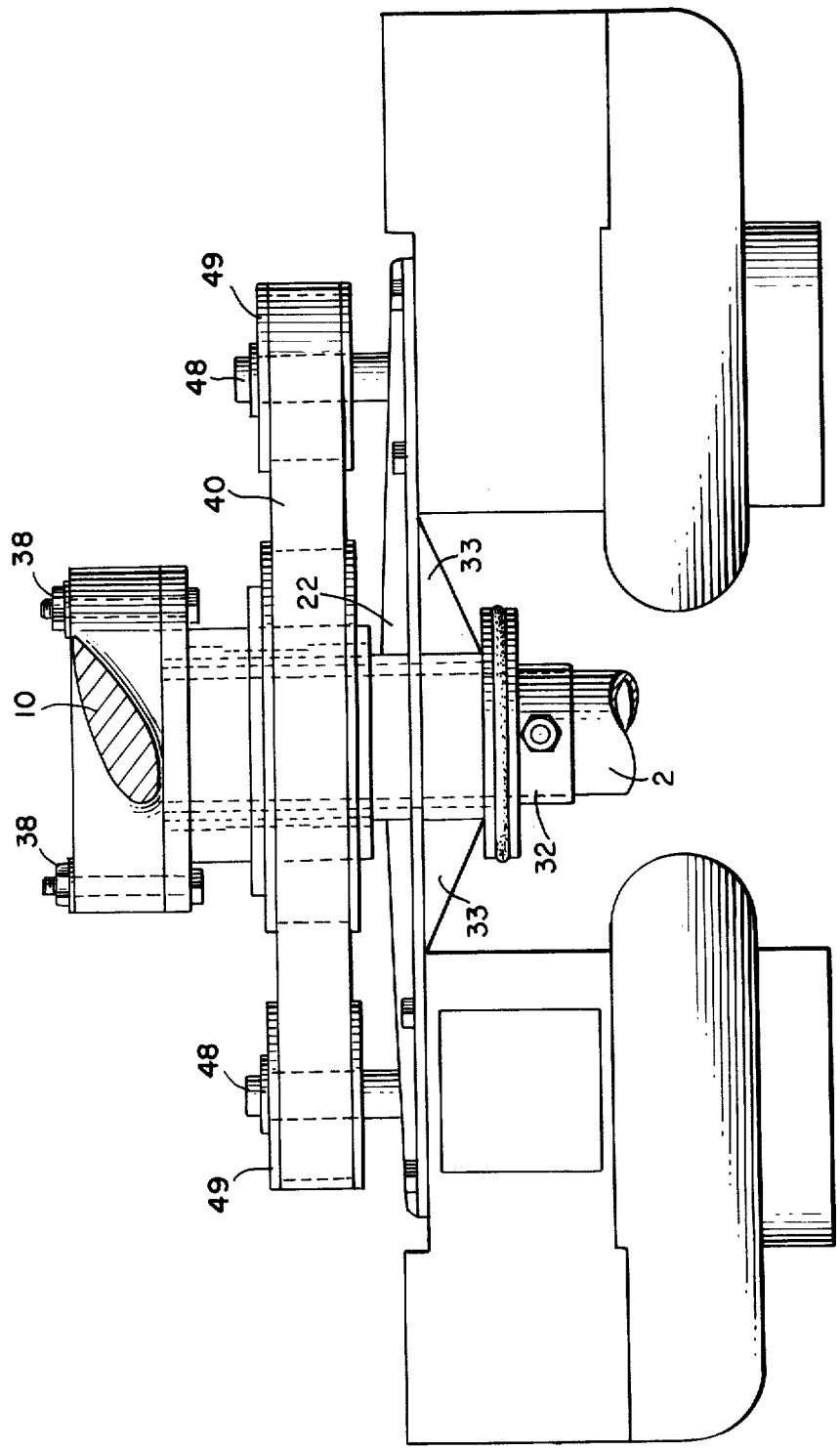

LIGHTWEIGHT AIRCRAFT

BACKGROUND OF THE INVENTION

This invention relates to aircraft and more particularly to a lightweight aircraft having a novel propeller assembly.

In the prior art, it has been the conventional practice to mount the propellers on the forward part of the aircraft or on a structure attached to, but separate from, the principal longitudinal load-carrying structural member. Even when building lightweight aircraft, it was still necessary to provide a heavy structure for the prime mover separate from the principal longitudinal member. These designs add weight to the aircraft and are complicated and costly. Thus, lightweight aircraft have been affordable and maintainable by only a limited number of persons.

Accordingly, it is the principle object of the present invention to provide an improved aircraft design.

Another object of the present invention is to provide an improved propeller-driven aircraft.

A further object of the present invention is to provide an improved lightweight aircraft having a novel propeller assembly requiring no additional complex mounting structure.

A still further object of the present invention is to provide an improved aircraft design that is economical to build and to service.

SUMMARY OF THE INVENTION

Generally, the embodiment of the present invention includes the novel design of a principal load-carrying member on which the wing, tail rudder, and elevator assemblies, propulsion means, and propeller are mounted. The propeller is mounted between the wing and the tail assemblies and rotates about the centerline of that principal load-carrying member.

BRIEF DESCRIPTION OF THE DRAWINGS

Other objects and advantages of the present invention will become more apparent to those persons having ordinary skill in the art to which the present invention pertains from the following description taken in conjunction with the accompanying drawings wherein:

FIG. 4 is an elevational view of a propeller and a propeller driving means utilizing an embodiment of the present invention.

FIG. 5 is a top plan view of the propeller and propeller driving means taken on line 5—5 of FIG. 4.

DETAILED DESCRIPTION OF THE PREFERRED EMBODIMENT

Figure 1:
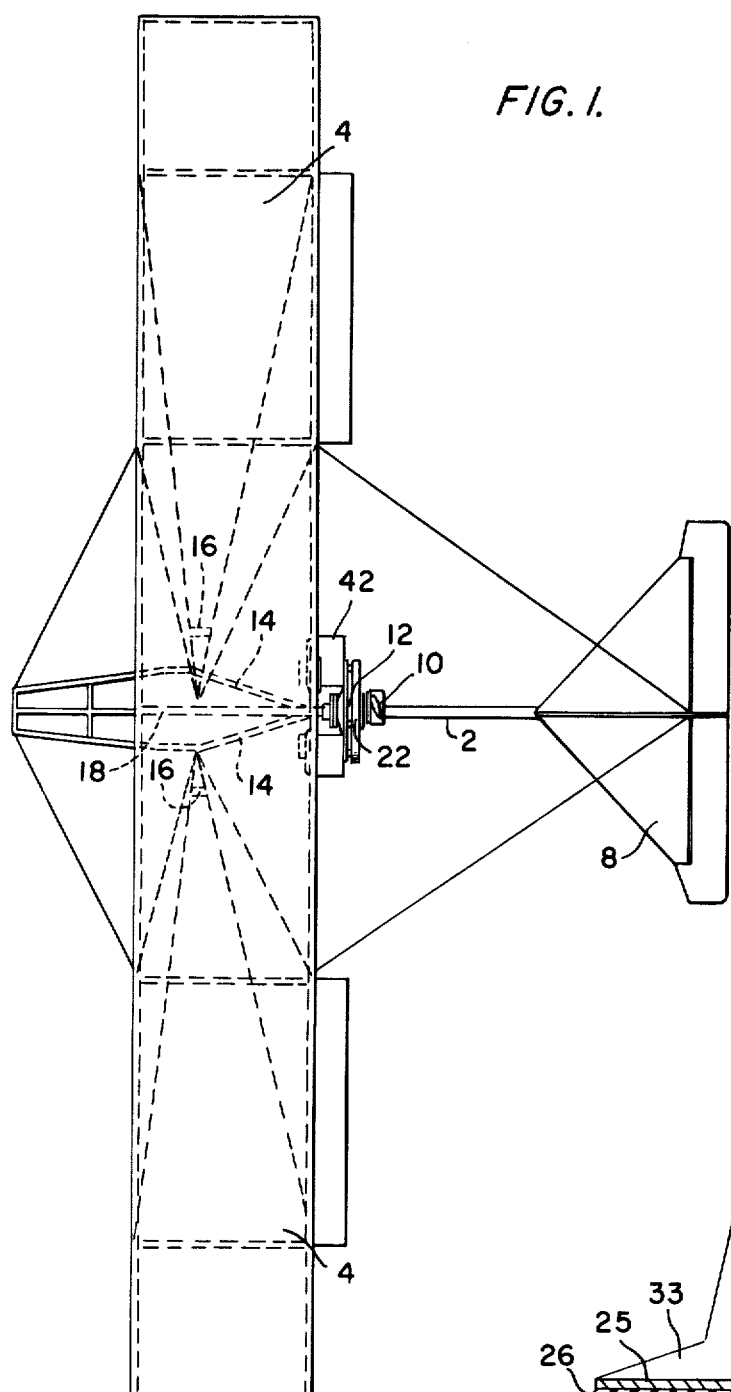
FIG. 1 is a top plan view of a lightweight aircraft showing an embodiment of the present invention.

Referring to FIGS. 1 through 6 of the drawings, there is illustrated a preferred embodiment of the present invention. Generally, this embodiment consists of a lightweight aircraft including a longitudinally-disposed, principal load-carrying structural member 2, wing assembly 4, tail fin 6, rudder 7, and elevator 8 assemblies, propeller 10, rotating means generally indicated at 12, struts 14, wheel structure 16, and an operator's station generally indicated at 18.

The tail assemblies 6 through 8 and the wing assembly 4 are mounted apart from each other on the principal load-carrying member 2. Propeller 10 and rotating means 12 are mounted between them for rotation about the longitudinal centerline of member 2. Struts 14 are also mounted on member 2 from the forward and aft connections of wing assembly 4 and extend generally downwardly. Vertical member 15 is attached to and perpendicular to member 2.

The struts 14 and vertical member 15 at their lower end are connected to the wheel structure 16 which is of conventional design. The operator's station 18 is also attached to the struts 14 but at points above the connection points for the wheel structure 16. The operator's station generally indicated at 18 comprises an operator's seat, a seat belt, and control sticks and pedals connected to control rotating means 12 and the position of the rudder assembly 7 thereby controlling flight characteristics.

The wing assembly 4 is conventional in design and generally consists of sailcloth secured to a frame that is mounted on the principal structural member 2.

The mounting assembly generally indicated at 22 for both the propeller 10 and the rotating means 12 includes a bearing seat 24, inner race 25, vibration dampening material 26, bearing means 28, and outer race 30.

The bearing seat 24 about which rotation occurs is mounted on inner race 25 and both are radially disposed about the principal load-carrying member 2.

Inner race 25 has a radially disposed thrust flange 32 and bracket 33. Thrust flange 32 is secured to member 2 to transmit thrust. The vibration dampening material 26 is disposed between inner race 25 and member 2 and prevents transmission of vibrations to member 2.

Bearing means 28 in the preferred embodiment comprises ball bearings mounted on bearing seat 24.

Outer race 30 is rotatably mounted on bearing means 28. It has flange sections 34 and 36; section 36 is positioned aft of section 34. Propeller 2 is secured to flange section 34 through bolts 38 or through equivalent means. Drive belt 40 is reeved about flange section 36.

Rotating means 12 includes engines 42 and drive belt 40. Housings of engines 42 are provided with flanges for mounting on bracket 33. Engines 42 include carburetors 44, exhaust outlets 46 and output shafts 48. Drive pulleys 49 are mounted on and are rotated by output shafts 48. Drive belt 40 is reeved around drive pulleys 49 and flange section 36.

Thus, output of engines 42 is through output shafts 48. The rotating shafts 48 cause drive pulleys 49 and thus belt 40 to turn outer race 30 through its flange section 34. The propeller 10, which is connected to outer race 30 by bolts 38, thus rotates about the longitudinal centerline of member 2. Resulting thrust is transmitted to member 2 by thrust flange 32.

Figure 6:
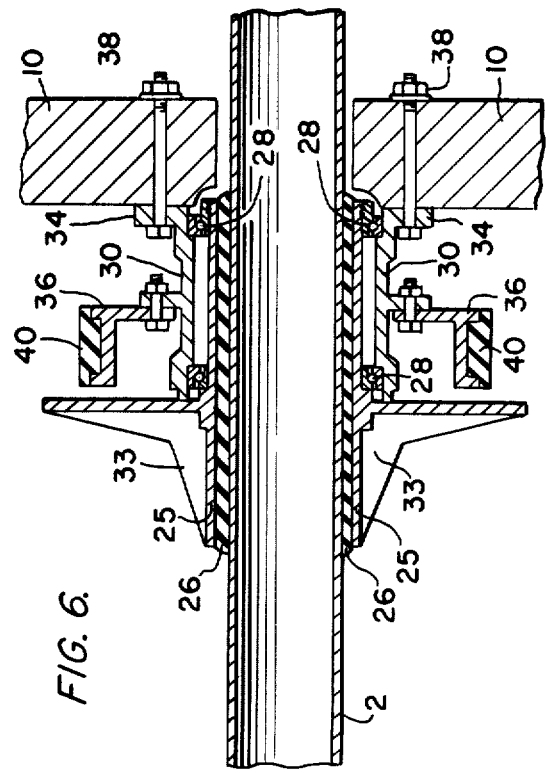
FIG. 6 is a side-elevational view taken on line 6—6 of FIG. 4.
Figure 3:
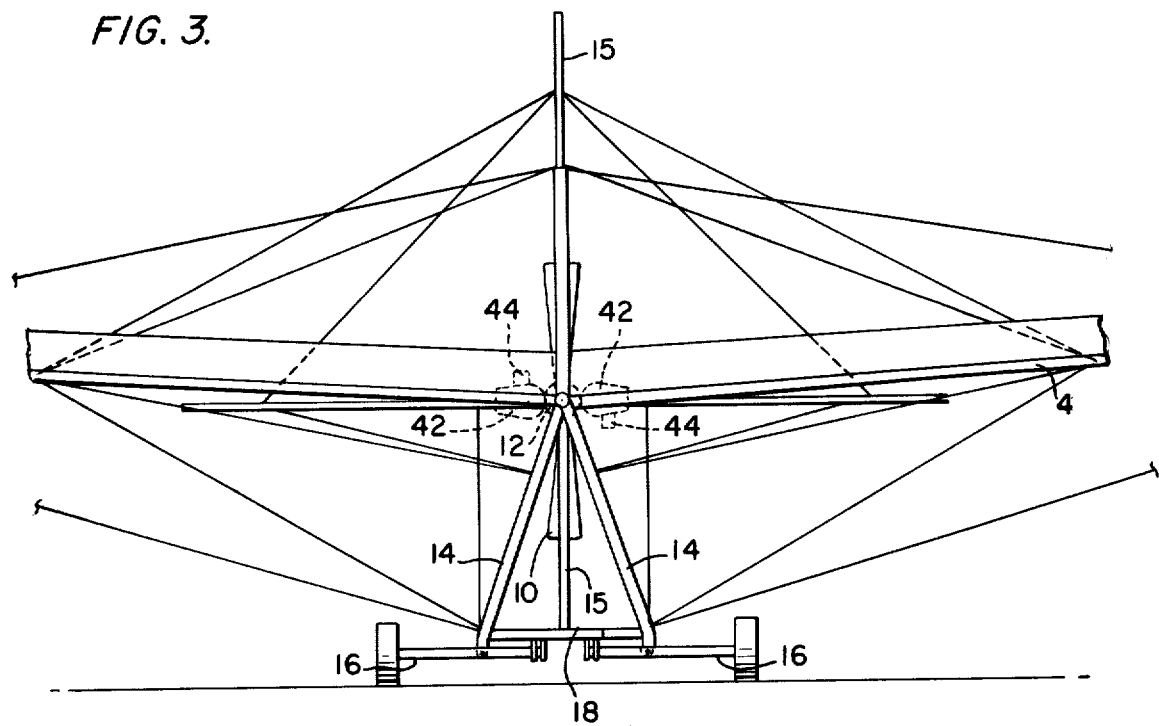
FIG. 3 is a sectional view of the aircraft taken on line 3—3 of FIG. 1.
Figure 7:
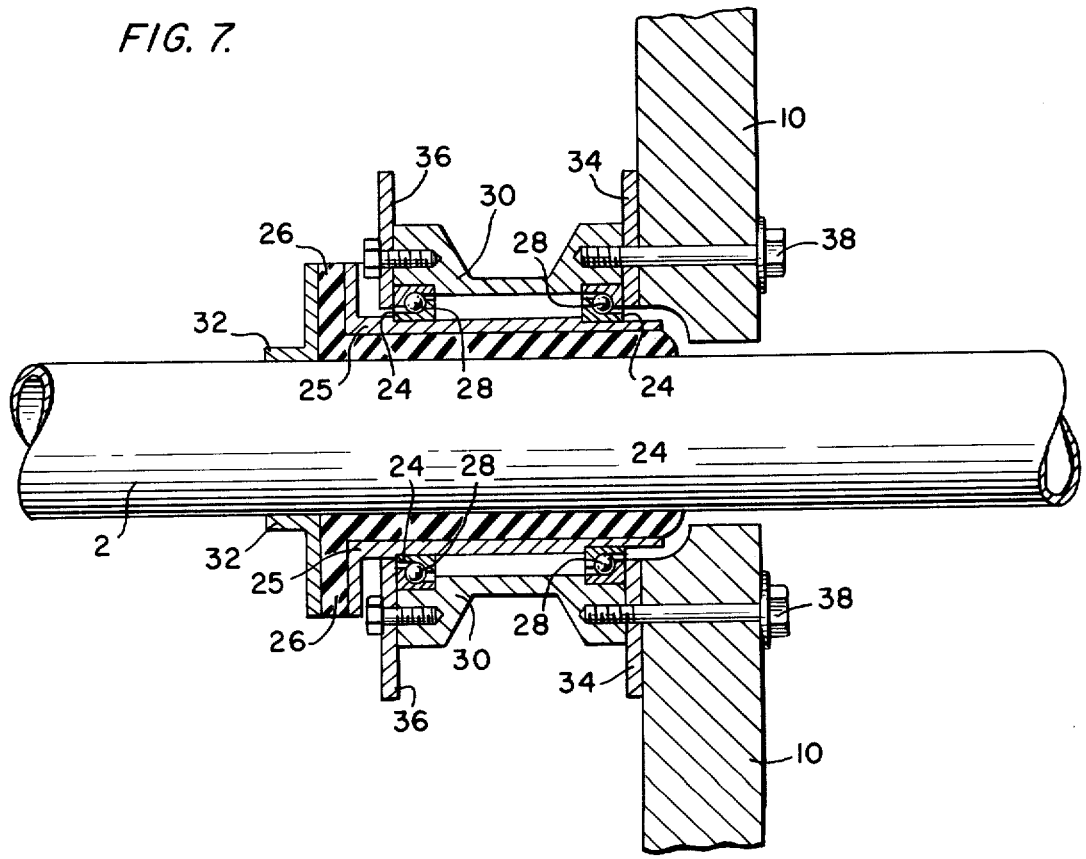
FIG. 7 is a side partial-sectional view of the novel propeller design shown in FIGS. 4 and 6 showing another embodiment of the invention using a different driving means.

Referring to the drawings, FIG. 7 shows another embodiment of the invention in which outer race 30 has a different construction in that flange section 36 is positioned at the aft end of outer race 30 instead of in the middle as shown in FIG. 6, and the engines 42 are not mounted on mounting assembly 22, but are mounted on member 2 on a separate assembly.

Figure 8:
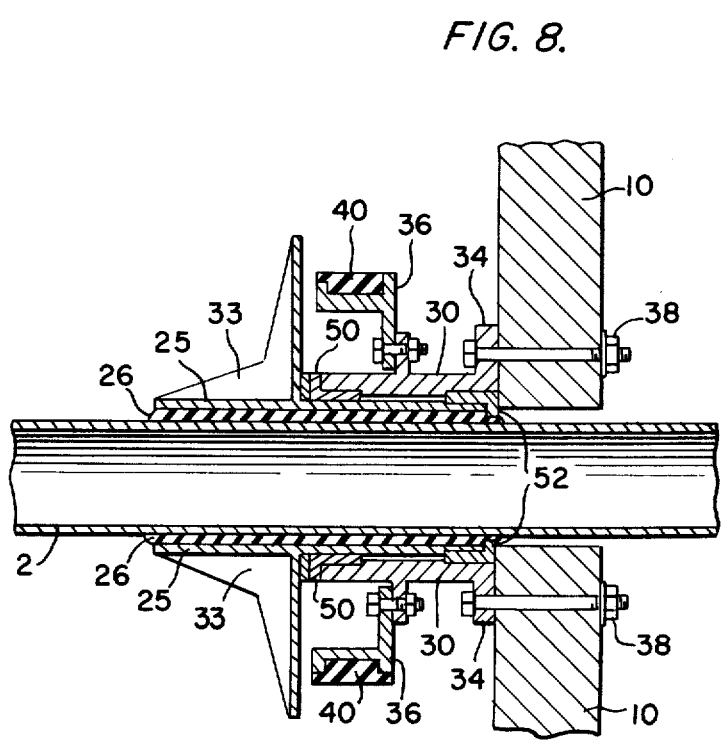
FIG. 8 is another embodiment of the invention shown in FIGS. 4 and 6 using a different bearing means.
Figure 2:
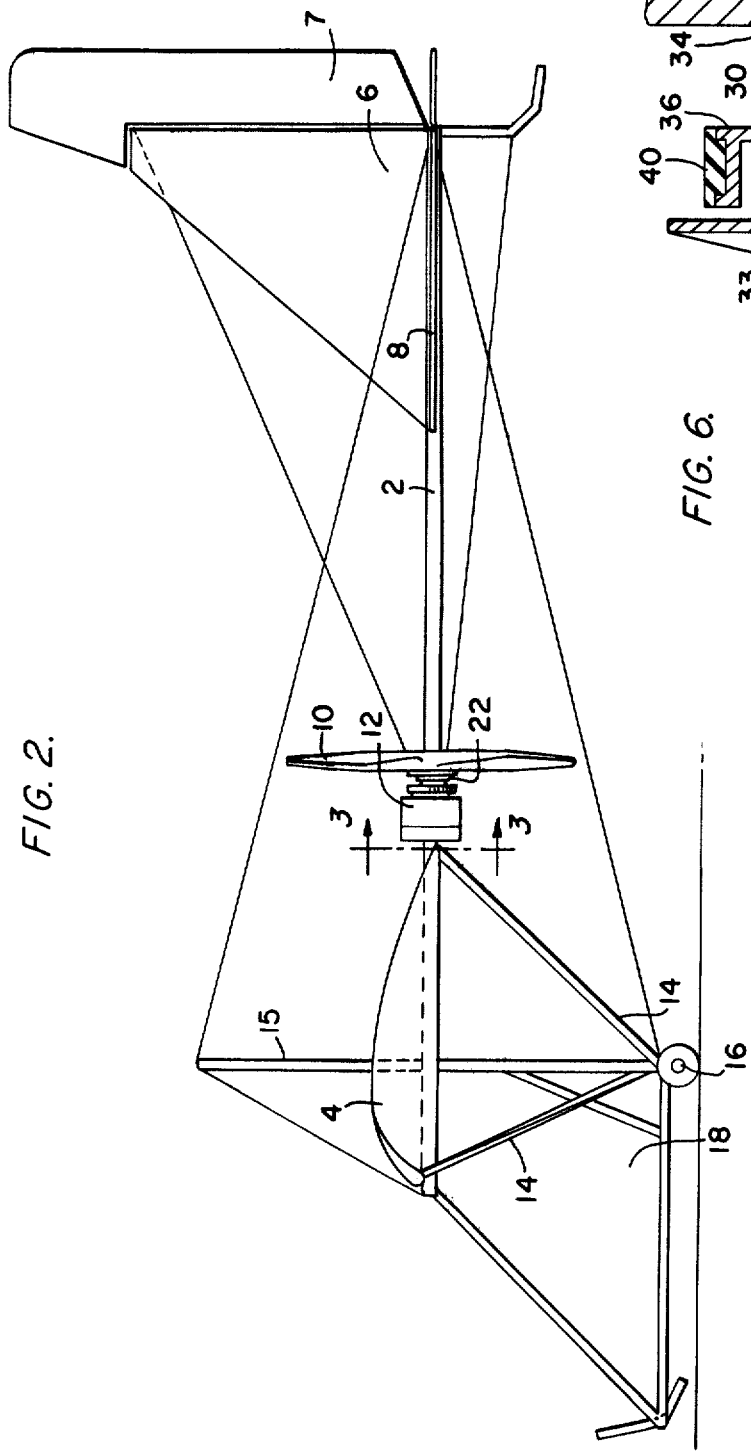
FIG. 2 is a side-elevational view of the aircraft shown in FIG. 1.

FIG. 8 shows a third embodiment of the invention in which bearing means 28 comprises split solid bearing consisting of an annular portion 50 and flanged portion 52.

It should also be noted that control cables connecting operator's control station 18 to the stabilizer assembly 8 and engines 42 may pass through the vibration dampening material 26.

Belt drive 40 has been shown to be a belt means, but gear, chain, or other equivalent drive means may be used.

The principal load-carrying member 2 may comprise a tubular aluminum or plastic member. Additional structural reinforcement in member 2 may be provided to handle the flight stresses.

The rotating means in the drawings has been shown to comprise two engines 42, but it should be noted that a single engine or more than two engines may be used in the present invention. In the preferred embodiment the engines may be two-cycle engines.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A lightweight aircraft comprising:
    a longitudinally disposed, principal longitudinal load-carrying member,
    a wing structure mounted on said load-carrying member,
    a tail rudder and elevator assembly mounted on said load-carrying member,
    a propeller mounted on said load-carrying member for rotation about a longitudinal centerline of said load-carrying member,
    at least one engine mounted on said load-carrying member,
    means drivingly connecting said engine to said propeller,
    a bearing seat mounted on said load-carrying member,
    said bearing seat including a bracket section and said engine being mounted on said bracket section, and bearing means mounted on said bearing seat, and
    said propeller being rotatably mounted on said bearing means.

2. A lightweight aircraft according to claim 1 wherein
    said wing is the principal lift generating structure.

3. A lightweight aircraft according to claim 1 wherein
    said wing structure is directly mounted on said load-carrying member.

4. A lightweight aircraft according to claim 1 wherein
    said propeller is disposed between said wing structure and said tail rudder and elevator assembly.

5. A lightweight aircraft according to claim 1 further comprising:
    vibration dampening means disposed between said bearing seat and said load-carrying member.

6. A lightweight aircraft comprising:
    a longitudinally disposed, principal longitudinal load-carrying member,
    a single-wing wing structure mounted on said load-carrying member,
    a tail rudder and elevator assembly mounted on said load-carrying member,
    a propeller mounted on said load-carrying member for rotation about a longitudinal centerline of said load-carrying member,
    said propeller being disposed between said wing structure and said tail rudder and elevator assembly,
    a bearing seat mounted on said load-carrying member,
    bearing means mounted on said bearing seat,
    said propeller being rotatably mounted on said bearing means,
    said bearing seat includes a bracket section,
    at least one engine mounted on said bracket section,
    connecting means drivingly connecting said engine to said propeller, and
    vibration dampening means disposed between said bearing seat and said load-carrying member.

7. A lightweight aircraft according to claim 6 wherein
    said bearing means comprises roller bearing means.

8. A lightweight aircraft according to claim 6 wherein
    said bearing means comprises split solid bearing means.

9. A lightweight aircraft according to claim 6, 7 or 8 wherein
    said connecting means comprises a belt drive.

10. A lightweight aircraft according to claim 6, 7 or 8 wherein
    said connecting means comprises a chain drive.

11. A lightweight aircraft according to claim 6, 7 or 8 wherein
    said connecting means comprises a gear drive.

12. A lightweight aircraft comprising:
    a longitudinally disposed, principal longitudinal load-carrying member,
    a wing structure mounted on said load-carrying member,
    a tail rudder and elevator assembly mounted on said load-carrying member,
    a sleeve fixedly disposed about said load-carrying member,
    a propeller rotatably disposed about said sleeve for rotation about a longitudinal centerline of said load-carrying member,
    at least one engine rigidly mounted on said sleeve,
    means drivingly connecting said engine to said propeller, and
    vibration dampening means disposed between said sleeve and said load-carrying member.

13. A lightweight aircraft comprising:
    a longitudinally disposed, principal longitudinal load-carrying member,
    a wing structure mounted on said load-carrying member, a rudder and elevator assembly mounted on said load-carrying member aft of said wing structure, a propeller means mounted on said load-carrying member for rotation about a longitudinal centerline of said load-carrying member, said propeller means being disposed between said wing structure and said rudder and elevator assembly, a bearing seat mounted on said load-carrying member, a bearing means mounted on said bearing seat, said propeller means being rotatably mounted on said bearing means, said bearing seat including a bracket section, at least one engine mounted on said bracket section, a connecting means drivingly connecting said engine to said propeller means, and a vibration dampening means disposed between said bearing seat and said load-carrying member.

* * * * *